United States Patent [19]

Anderson et al.

[11] 4,275,888
[45] Jun. 30, 1981

[54] STABILIZING AND STATIC REMOVING ATTACHMENT FOR PHONOGRAPH PICKUP CARTRIDGE

[75] Inventors: Carl R. Anderson, Willmette; James J. Wellwood, Elmhurst; Lawrence R. Happ, Mundelein, all of Ill.

[73] Assignee: Shure Brothers, Inc., Evanston, Ill.

[21] Appl. No.: 89,377

[22] Filed: Oct. 30, 1979

Related U.S. Application Data

[63] Continuation of Ser. No. 874,055, Feb. 1, 1978, abandoned.

[51] Int. Cl.³ .............................................. G11B 3/58
[52] U.S. Cl. ...................................... 369/74; 369/247
[58] Field of Search ..................... 274/23, 47, 24, 37; 15/1.5 A, 1.5 R

[56] References Cited

U.S. PATENT DOCUMENTS

| | | | |
|---|---|---|---|
| 1,193,242 | 8/1916 | Delany | 274/47 |
| 2,259,275 | 10/1941 | Stone | 274/47 |
| 2,262,503 | 11/1941 | Kieralff | 274/25 |
| 2,338,843 | 1/1944 | Glaser et al. | 15/1.5 R |
| 2,418,617 | 4/1947 | Bessire | 179/100.41 P |
| 2,449,972 | 9/1948 | Beach | 175/264 |
| 2,572,712 | 10/1951 | Fisher | 274/24 |
| 2,583,622 | 1/1952 | Zimmerman | 274/38 |
| 2,647,753 | 8/1953 | Goldmark | 274/23 R |
| 2,716,551 | 8/1955 | Bachman | 274/24 |
| 2,744,212 | 5/1956 | Baum | 274/47 |
| 2,754,372 | 7/1956 | Weathers | 274/13 R |
| 2,958,529 | 11/1960 | King | 274/47 |
| 3,189,353 | 6/1965 | Grado | 274/47 |
| 3,226,124 | 12/1965 | Peterson | 274/24 |
| 3,301,565 | 1/1967 | Bachman | 274/24 |
| 3,572,725 | 3/1971 | Murphy | 274/47 |
| 3,914,817 | 10/1975 | Lindsay | 15/1.5 R |
| 4,082,294 | 4/1978 | Myers et al. | 274/47 |
| 4,131,284 | 12/1978 | Rangsby | 274/23 R |
| 4,134,594 | 1/1976 | Post et al. | 274/47 |

FOREIGN PATENT DOCUMENTS

| | | | |
|---|---|---|---|
| 2403603 | 8/1974 | Fed. Rep. of Germany | 15/1.5 R |
| 1509041 | 4/1978 | United Kingdom | 274/23 R |

OTHER PUBLICATIONS

Pickering, XV-151750E DCF Series Specifications, 10-1968.
Hunt, F. V., The Rational Design of Phonograph Pickups, Journal of the Audio Eng. Soc., vol. 10, No. 7, 10-1962.
"Disctracker System", Publication.
Pickering, No. 34, Render Service Card, 1978.
The B.A.S. Speaker, vol. 7, No. 1, Oct. 1978.
Bauer, B. B., On the Damping of Phonograph Arms, Journal of the Audio Engineering Society, vol. 11, No. 3, 7-1963, pp. 207-211.
Hoshimi, S.; Suwa, H.; Moris, N., Advance in Turntable and Tone Arms Design, Audio Eng. Soc., Preprint No. 1080, 11-1975.
Phoenix, S. L., The Role of Damping in Tonearm/Cartridge Performance, BAS SPEAKER, 1-1975.
Kogen, J.; Jakobs, F.; Karlov, F., Trackability-1973, Audio, 8-1973, pp. 16-22.
"Celestion & Decca", Brochure, Rocelco, Inc.
Rangabe, A. R., "New Method of Arm/Cartridge Damping".
Happ, L. and Karlov, F., Record Warps and System Playback Preformance, Audio Engineering Society, Preprint No. 926, 9-1973.
Naka, G. T., Dynamic Damping of Stylus/Tone-Arm Resonance, Journal of Audio Engineering Society, vol. 21, No. 7, 9-1973, pp. 555-562.

Primary Examiner—John W. Shepperd
Attorney, Agent, or Firm—Alegretti, Newitt, Witcoff & McAndrews

[57] ABSTRACT

An attachment for a phonograph pickup cartridge capable of removing static and stabilizing vibration of the cartridge body. A brush comprising bristles capable of engaging the inside of the grooves of a disc-type phonograph record is coupled to the cartridge body through a bearing which provides a mechanical resistance capable of damping both vertical and lateral vibrations. The brush is made from an electrical conductor, such as carbon, and is connected to the shield of the cartridge to remove static electricity from the surface and grooves of the record.

18 Claims, 16 Drawing Figures

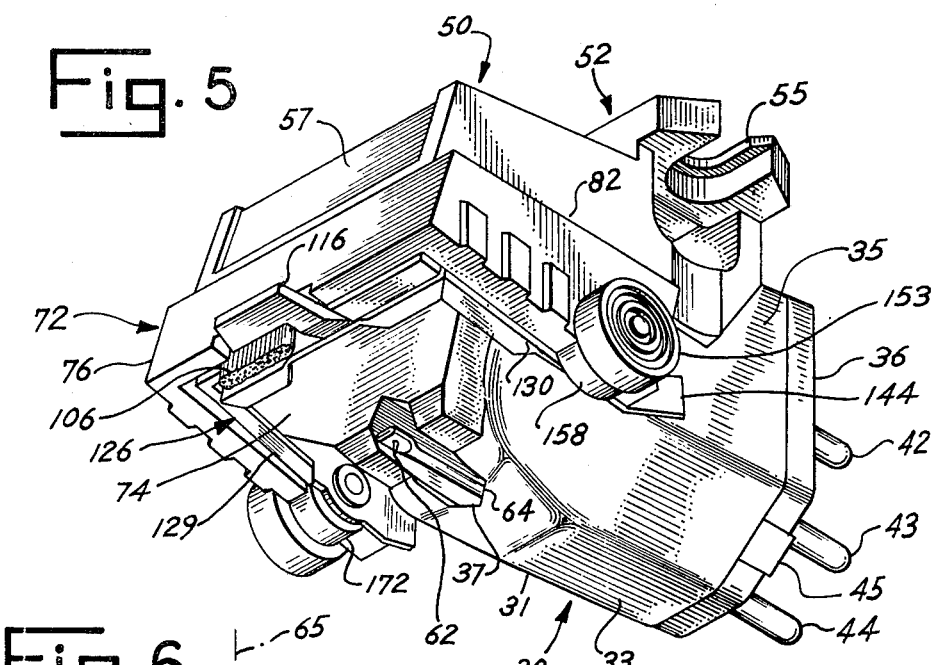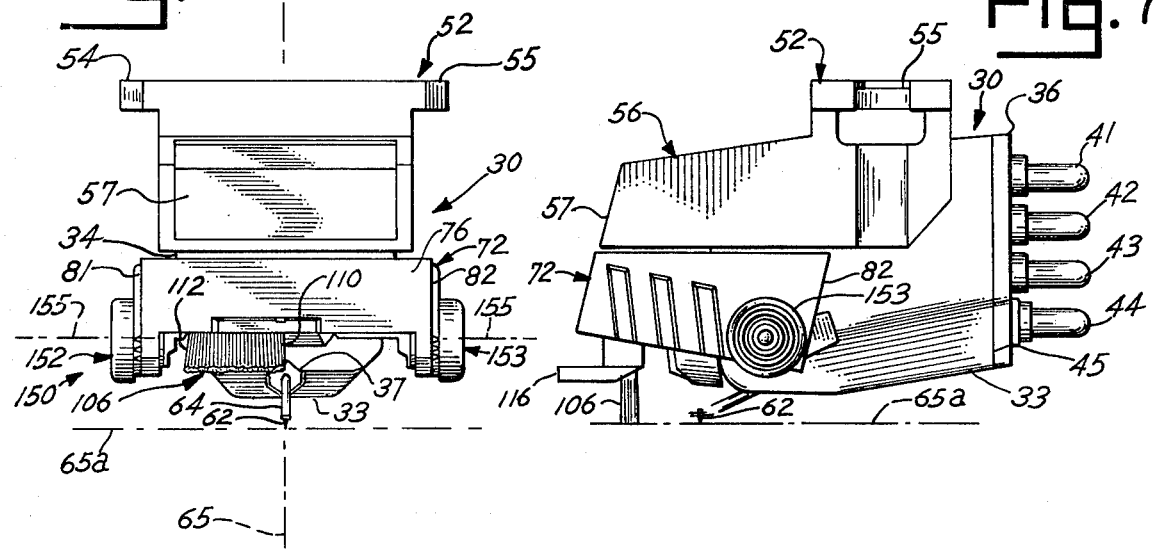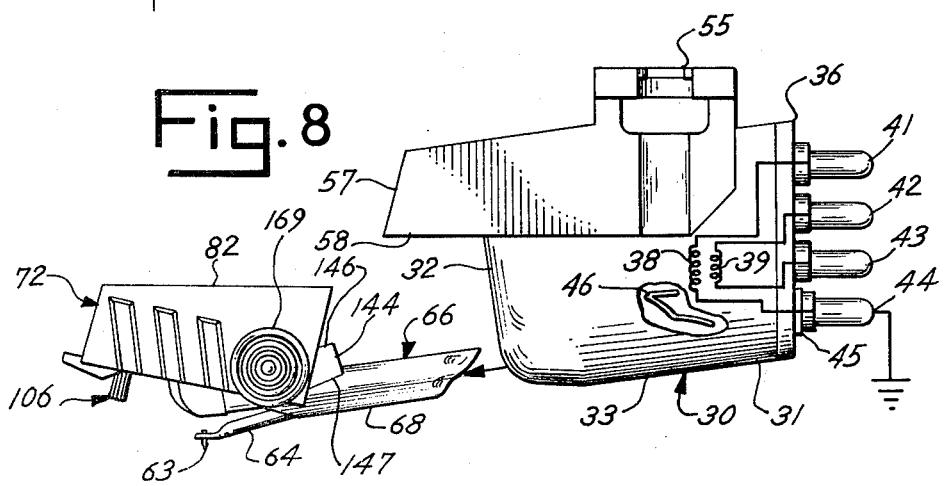

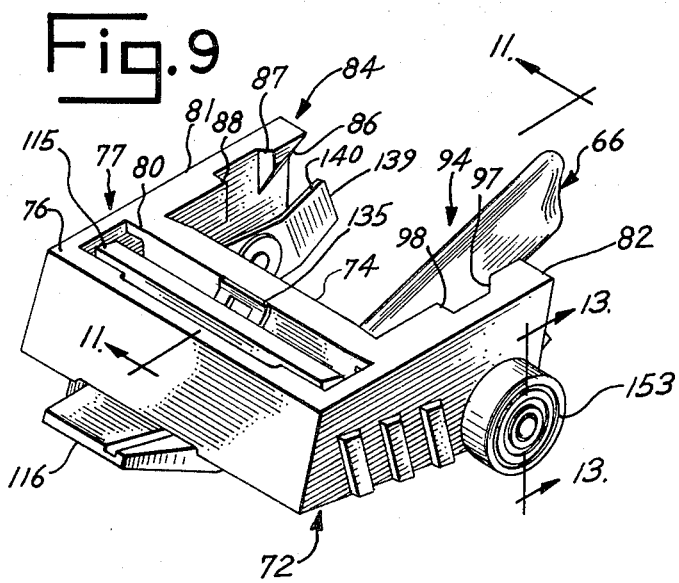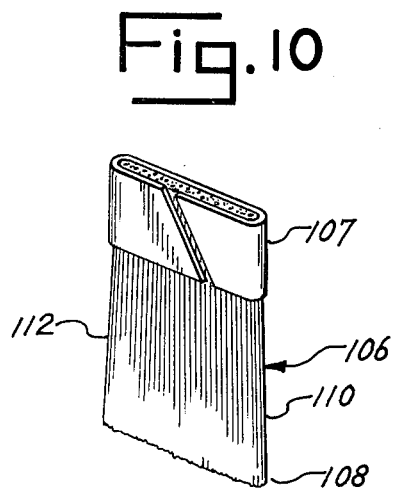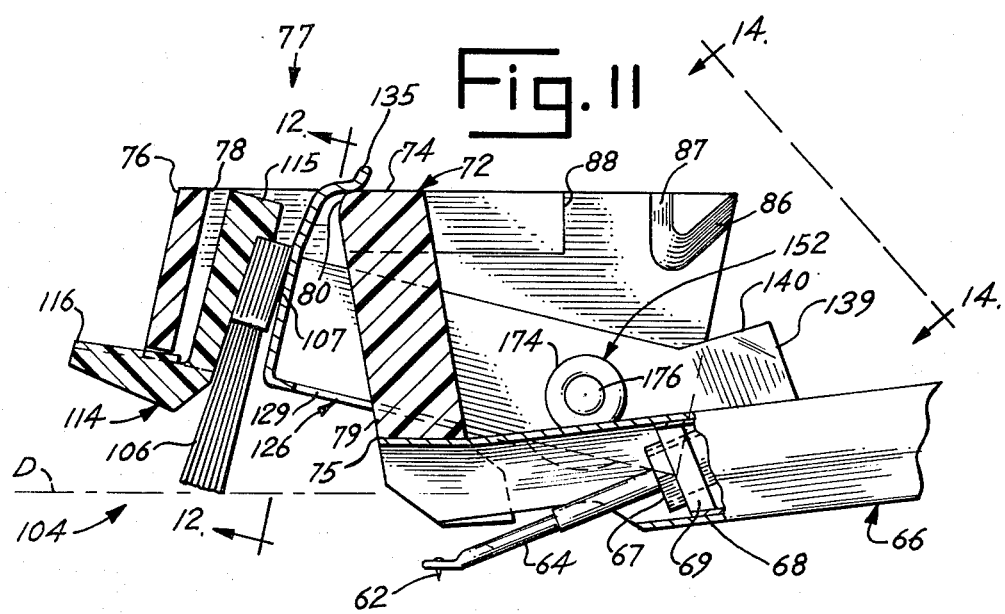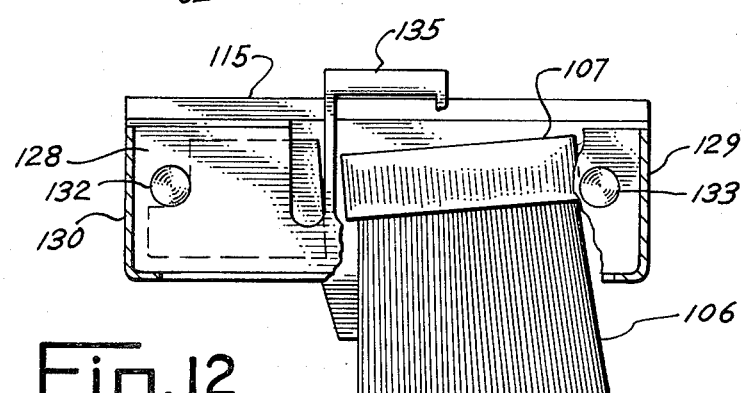

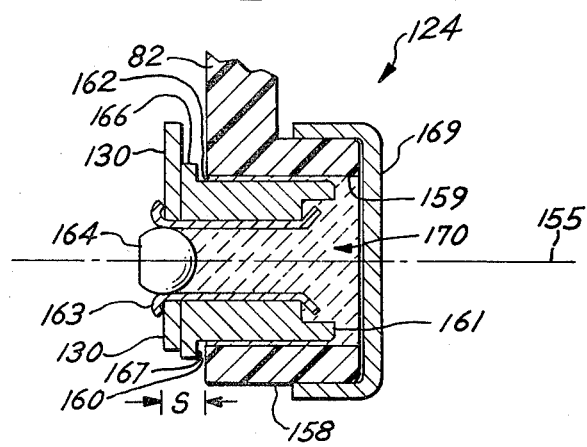
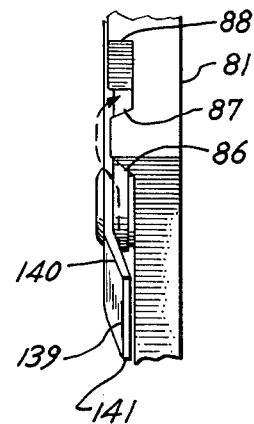
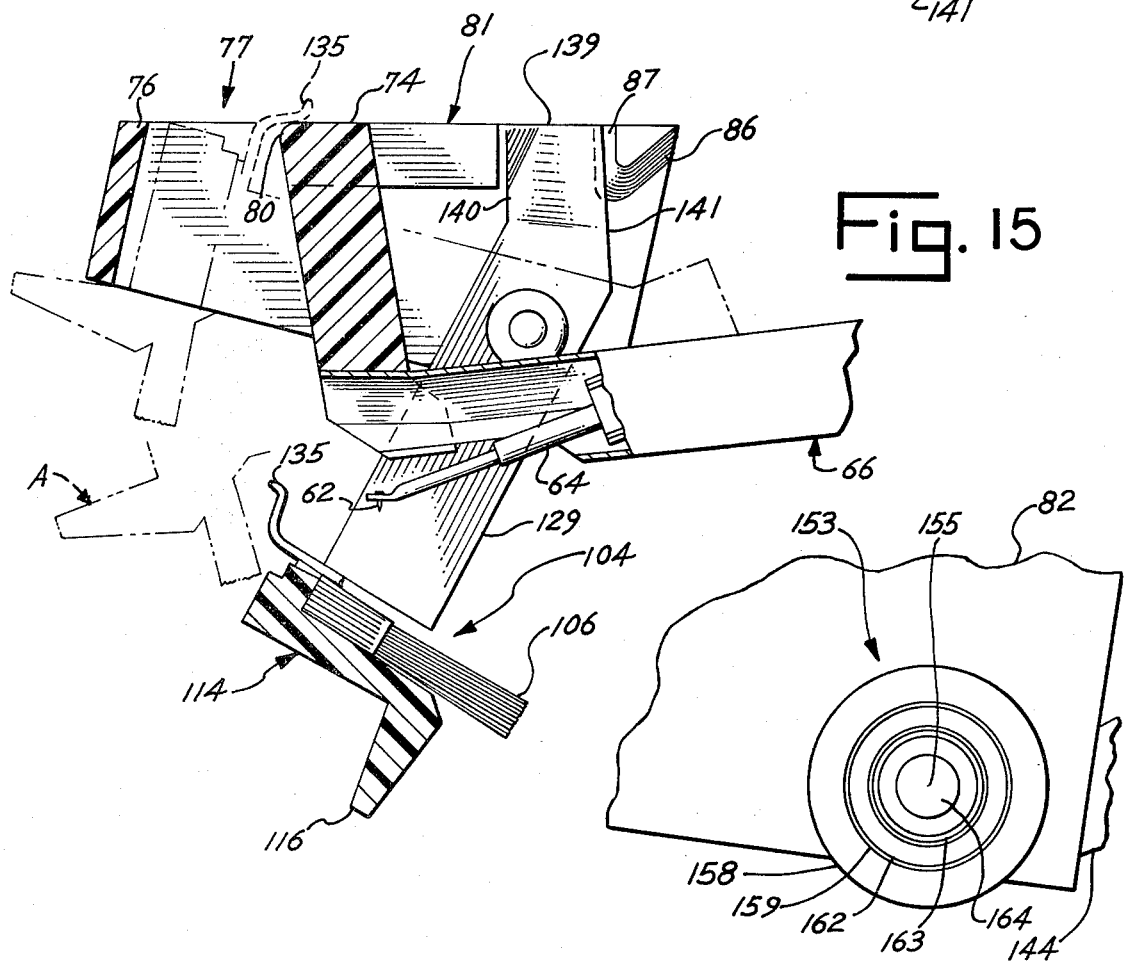

STABILIZING AND STATIC REMOVING ATTACHMENT FOR PHONOGRAPH PICKUP CARTRIDGE

This is a continuation of application Ser. No. 874,055 filed Feb. 1, 1978, now abandoned.

BACKGROUND AND SUMMARY OF THE INVENTION

This invention relates to phonograph pickup cartridge attachments and more particularly relates to attachments capable of vibration damping and static removing.

The phonograph pickup cartridge industry has long sought a economical and reliable device which could simultaneously damp unwanted vibrations of the cartridge body and remove unwanted static electricity from the surface of a phonograph record disc. Damping devices for phonograph cartridges or tone arms have been devised in the past, but each has exhibited deficiencies which have limited its overall usefulness. Two such devices are illustrated in U.S. Pat. No. 2,754,372 (Weathers—July 10, 1956) and U.S. Pat. No. 3,301,565 (Bachman—January 31, 1967). The Weathers Patent describes a brush which is rigidly attached to a phonograph pickup cartridge body and which does not effectively engage the grooves of a record, but rather rides along the record surface. The Bachman Patent describes a resilient pad which is attached to the head of a tone arm through a pivot arm so that the cushion can move in a vertical direction with respect to a recording disc surface. A layer of viscous lubricant is placed between the tone arm and pivot arm to provide viscous damping. Both Weathers and Bachman teach that substantially more force should be applied to the brush or pad than to the stylus of the pickup cartridge. It has been discovered that this technique leads to unfortunate results when applied to modern record discs having variable pitch grooves. Since the brush or pad must ride in advance of the stylus, the pitch of the grooves acting on the pad or brush may be different from the pitch of the groove engaging the stylus. As a result, the brush or pad tends to bias the stylus out of the center of the groove it is engaging. This results in a tracking force which is excessive against one side of the groove and insufficient against the opposite side of the groove.

Another approach to tone arm or cartridge damping was suggested by A. R. Rangabe in a paper entitled "A New Method of Arm-Cartridge Damping", presented at a meeting in London, England in March, 1975. Rangabe suggests a cylindrical cup with a bottom surface defining a large radius of curvature which rides on a record adjacent a pickup cartridge stylus. The cup is partly filled with a high viscosity silicone fluid and is arranged coaxially around a spigot which is immersed in the fluid. A highly compliant rubber diaphragm is bonded to the cup and the spigot. Although Rangabe teaches that the force on the cup should be less than the force on the stylus, he suggests no means for damping vibrations parallel to the surface of the record and provides no means for removing static electricity from the recording disc. The Rangabe arrangement inherently generates vibrations which are picked up by the stylus, thereby creating "needle talk" of the type referred to in the March, 1975 Rangabe paper. In an attempt to reduce the "needle talk", Rangabe uses a lubricant on the bottom of the cup. The lubricant must be periodically replaced and only partially reduces the "needle talk".

Accordingly, it is a primary object of the present invention to provide an attachment for damping vibrations of a phonograph cartridge body occurring both perpendicular and/or parallel to the surface of a rotating phonograph recording disc having grooves engaged by a stylus which is supported by the body.

Another object of the present invention is to provide an attachment of the foregoing type which also removes static electricity from the grooves of a recording disc, as well as the surface of the disc.

Still another object of the present invention is to provide an attachment of the foregoing type which does not bias the stylus out of the center of the groove the stylus is engaging.

Yet another object is to provide an attachment of the foregoing type in which vibrations of a phonograph cartridge body perpendicular to the surface of the recording disc are damped by a substantially constant mechanical resistance.

Still another object is to provide an attachment of the foregoing type which minimizes "needle talk" of the type described by Rangabe.

DESCRIPTION OF THE DRAWINGS

These and other objects and features of the present invention will hereafter appear for purposes of illustration, but not of limitation, in connection with the accompanying drawings, wherein like numbers refer to like parts throughout, and wherein:

FIG. 5 is a perspective view of a conventional phonograph cartridge employing an attachment which embodies a preferred form of the present invention;

FIG. 6 is a front elevational view of the cartridge shown in FIG. 5;

FIG. 7 is a right side elevational view of the cartridge shown in FIG. 5 with a brush of the attachment lowered into operating position;

FIG. 8 is an exploded view of the cartridge shown in FIG. 7 from which the novel attachment made in accordance with the present invention has been removed;

FIG. 9 is a perspective view of the attachment shown in FIG. 8;

FIG. 10 is a perspective view of a portion of the brush assembly included in the attachment shown in FIG. 8;

FIG. 11 is an enlarged, partially cross sectional view taken along line 11—11 in FIG. 9;

FIG. 12 is a cross sectional view taken along line 12—12 in FIG. 11;

FIG. 13 is a cross sectional view of a preferred form of bearing made in accordance with the present invention shown in cross section and taken along line 13—13 of FIG. 9;

FIG. 14 is an enlarged, fragmentary, top plan view of preferred form of detent used in the preferred embodiment;

FIG. 15 illustrates the same apparatus shown in FIG. 1 in which the brush assembly has been moved to the guard position; and FIG. 16 is a side elevational view of the bearing shown in FIG. 13 with the cap removed.

DESCRIPTION OF THE PREFERRED EMBODIMENT

Figure 1:
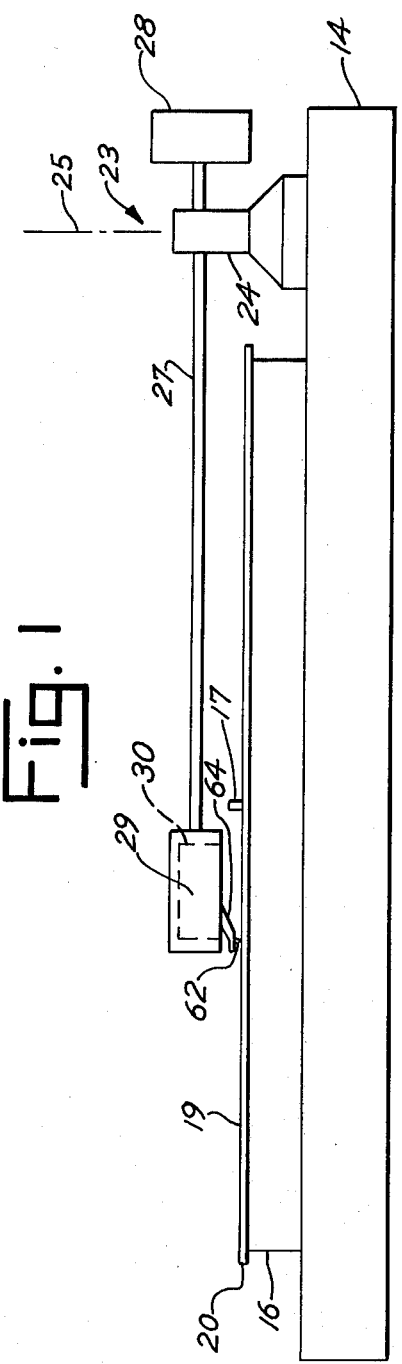
FIG. 1 is a schematic side elevational view of a conventional record disc transducing system.
Figure 3:
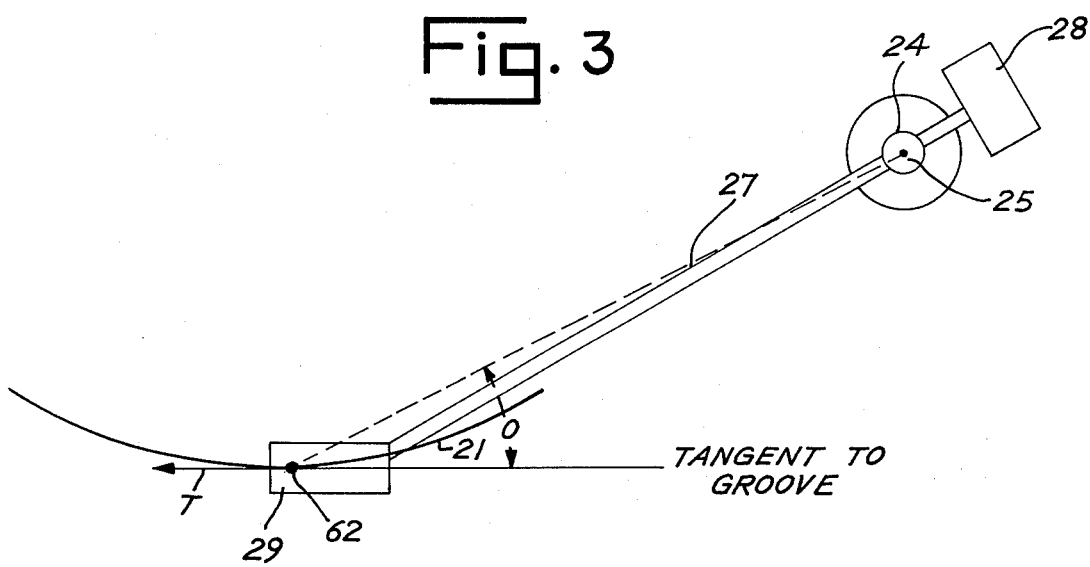
FIG. 3 is a schematic top plan view of a portion of the system shown in FIG. 1.

Referring to FIGS. 1 and 3, a preferred form of trancribing system suitable for use in connection with the present invention comprises a base 14 which supports a rotatable turntable 16 bearing a central spindle 17. A central hole in a phonograph disc recording 20 is placed over spindle 17 so that the disc is centrally located on turntable 16. The disc defines a planar surface 19 which bears grooves of variable pitch, such as groove 21.

A tone arm assembly 23 is mounted on base 14 through a central pivot 24 so that the tone arm rotates around a vertical axis 25. Suspended on the pivot is a tone arm 27. A counterweight 28 is movably mounted to one end of the tone arm, and a head 29 is located at the free end of the tone arm. The head is offset from the axis of the tone arm by an angle O.

Referring to all of the drawings, head 29 supports a standard phonograph cartridge body 30 which includes a metallic cartridge shield 31 having a front surface 32, an undersurface 33, a left side surface 34, a right side surface 35, an edge 36 and a frontal opening 37. As shown schematically in FIG. 8, opening 37 provides access to coils 38 and 39 which may be similar to coils 1 and 2 shown in U.S. Pat. No. 3,007,521 (Ahrens et al—Feb. 12, 1963). The coils are interconnected with metallic pins 41–44 in the manner shown in FIG. 8. Shield 31 is connected to pin 44 by means of a metallic strap 45. A resilient, metallic clip 46 is electrically and mechanically connected to shield 31. The upper portion of shield 31 bears a mounting assembly 50 and includes a mounting plate 52 which defines mounting slots 54 and 55. The mounting slots are used with corresponding screws to mount the cartridge body to head 29 of tone arm 27. Assembly 50 also includes a guard lip 56 defining a front surface 57 and a lower surface 58.

As used in the specification, the vertical direction means a direction perpendicular to the planar surface of disc 20 and the lateral direction means a direction parallel to the planar surface of disc 20.

Cartridge body 30 carries a phonograph stylus 62 having a tip 63 which is adapted to engage the grooves of disc 20. The stylus is mounted to the free end of a shank 64. The grooves cut in disc 20 represent audio waves, and stylus 62 vibrates according to the information carried by the grooves. Cartridge body 30 is a transducer which changes the vibrations of stylus 62 due to contact with the grooves into corresponding electrical signals which can be amplified and converted to sound waves.

Figure 2:
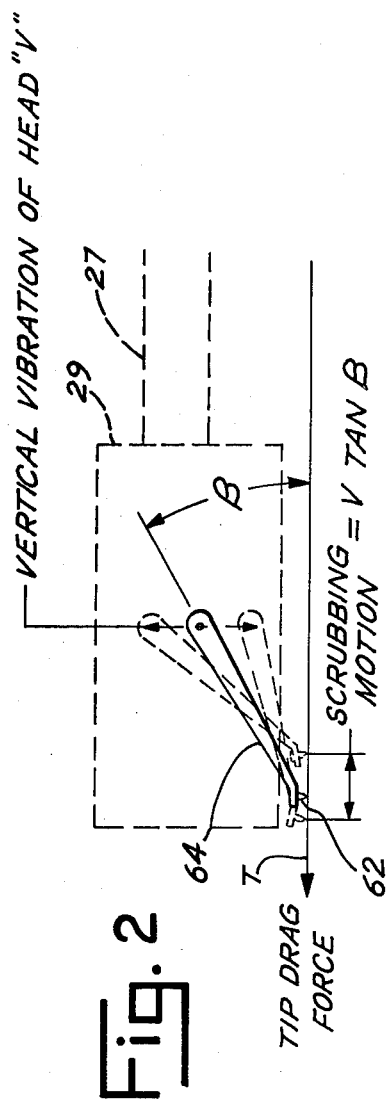
FIG. 2 is an enlarged schematic side elevational view of the tone arm head and stylus portion of the system shown in FIG. 1 which illustrates the type of scrubbing motion induced in the stylus by vertical vibration of the tone arm head.
Figure 4:
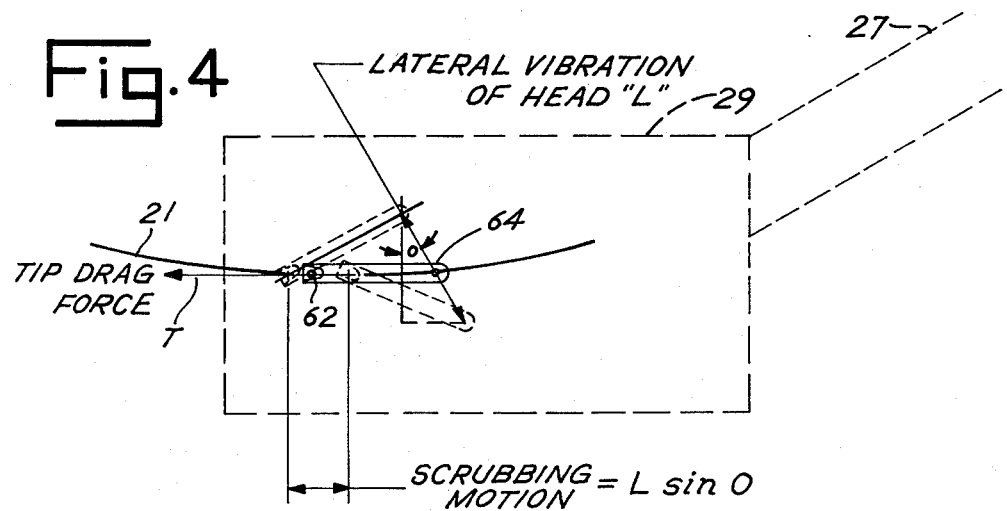
FIG. 4 is an enlarged schematic top plan view of the tone arm head and stylus shown in FIG. 3 which illustrates the scrubbing motion induced in the stylus by the lateral vibration of the tone arm head.

Just as a weight hanging from a spring has a natural frequency of resonance, so does a stylus mounted in a support system, including the compliance of the cartridge body and the effective mass of the tone arm and the cartridge body combined, have a low frequency tracking resonance. Ideally, frequencies below the resonance frequency, such as those produced by warps, eccentric grooves, and the spiral grooving of disc 20, will move the whole cartridge and tone arm with no relative motion of the stylus and cartridge body. Consequently, no electrical output is generated by the cartridge. Frequencies above the resonance frequency will vibrate the stylus, but not the tone arm or cartridge body which remains centered above the groove. Thus, the system plays the useful information recorded in the grooves and ignores the rest, except at the resonance frequency. At the resonance frequency, the motion of the cartridge body and tone arm is magnified considerably. FIGS. 2 and 4 illustrate the stylus "scrubbing" motion which occurs due respectively to vertical and lateral vibrations of the cartridge body at the resonance frequency. This scrubbing motion causes the audible information in the grooves to warble in pitch, just as if the turntable speed were fluctuating. Although typical sources of vibrations at the resonance frequency, such as floor vibrations and record wraps, have a predominantly vertical component, it has been discovered that they also have a substantial horizontal component. Some of the impact energy from a warp or a floor vibration may also be translated into lateral vibrations by passing through the tone arm suspension system.

As shown in FIG. 2, a vertical vibration causes stylus scrubbing motion equal to V tan B, where B is the angle that the stylus shank makes with the planar surface of disc 20, and V is the velocity of the linear motion through which head 29 is vibrated. FIG. 4 shows the scrubbing velocity experienced by the stylus in response to the lateral vibrations of head 29. The amount of scrubbing velocity is equal to L sin O, where L equals the velocity with which head 29 is laterally vibrated, and O is the offset angle of head 29 (See FIG. 3).

It has been discovered that the scrubbing motion due to both the vertical and lateral vibrations described in FIGS. 1–4 can be substantially damped, if not eliminated, by using the unique attachment described in FIGS. 5–16. As shown in the drawings, the attachment basically comprises a stylus assembly 66, a frame 72, a brush assembly 104 and a stabilizing assembly 124.

Stylus assembly 66 comprises stylus 62 and a shank 64 which jointly define a plane 65 bisecting the shank and stylus. Another plane 65a perpendicular to plane 65 passes through tip 63 of stylus 62 (FIG. 6). The end of the shank opposite the stylus is connected to a magnet 67 (FIG. 11). The magnet and the shank are supported on the inside of a hollow, copper housing 68 by an elastomeric cushion 69 similar to cushion 31 shown in U.S. Pat. No. 3,077,522 (Gunter et al—Feb. 12, 1963) (FIGS. 8 and 11). Cushion 69 comates snugly with the inside walls of housing 68 so that the stylus, shank and magnet are free to vibrate in the vertical and lateral directions. Housing 68 has a generally square cross section adapted to fit into opening 37 of shield 31 (FIGS. 5 and 6). When the stylus assembly is inserted inside shield 31, it cooperates with coils 38 and 39 to produce electrical signal voltages on pins 41 and 42 corresponding to information carried in the grooves of disc 20 (FIG. 8).

Frame 72 is molded from a plastic made conductive by the inclusion of carbon particles. The frame includes a rear strut 74 defining an upper edge 80 and having a lower end fused to the front of stylus housing 68 along a seam 75 (FIGS. 9 and 11). A front strut 76 extends parallel to strut 74 and defines a slot 77 having a front wall 78 and a rear wall 79. Struts 74 and 76 support a left member 81 and right member 82. The left member defines a detent 84 comprising a cam surface 86, a bevel surface 87 and a stop surface 88 (FIGS. 9, 11 and 14).

The right member defines a detent 94 comprising a cam surface corresponding to surface 86 (not shown), a bevel surface 97 and a stop surface 98. Detent 94 is the mirror image of detent 84. The detents cooperate with the stabilizing assembly in a manner described later.

Brush assembly 104 comprises a brush 106 which is held at one end by a brass clamp 107 (FIG. 10). At least a majority of the free ends of the brush bristles 108 have a diameter sufficiently small to engage the inside of the grooves of disc 20. Preferably, all of the bristles have a diameter of about 0.3 mil and are made from electrical conductive material, such as carbon fibers. The brush has a right edge 110 which is substantially aligned with plane 65 (FIG. 6) and a left edge 112 which is aligned between plane 65 and side 81. A biasing mass 114 is cemented to clamp 106 (FIGS. 11 and 12). The mass includes a vertically oriented block 115 and a finger tab 116 which can be used to raise or lower the brush. The mass weighs 0.3 to 0.4 grams which is sufficient to bias brush 106 against disc 20 with a force of about 0.5 gram.

Stabilizing assembly 124 comprises a conductive, flexible, stainless steel, u-shaped lever 126 (FIG. 5). The lever includes a cross member 128 which is integrally formed with a left pivot arm 129 and an identical right pivot arm 130 (FIGS. 5 and 21). Biasing mass 114 is attached to cross member 128 by studs 132, 133 which protrude through corresponding holes in member 128 (FIG. 12). Brush clamp 107 is electrically connected to member 128 by use of a conductive paint. The upper portion of member 128 is stamped to form a u-shaped clip 135 which engages edge 80 to hold brush 106 in an upper inoperative position (FIGS. 9 and 11).

Arm 129 terminates in a lever 139 defining a leading edge 140 and a trailing edge 141 (FIGS. 9 and 15). Arm 130 terminates in a lever 144 identical to lever 139 defining a leading edge 146 and a trailing edge 147 (FIG. 8). Levers 139 and 144 engage detents 84 and 94 respectively in a manner described later.

Bearing assembly 150 comprises a pair of bearings 152, 153 arranged as a trunnion to define an axis of rotation 155 (FIG. 6). The bearings are identical and can be understood from the description of bearing 153 shown in FIGS. 13 and 16. Right member 82 of the frame is molded to form a hollow cylindrical hub 158 having an outer bearing surface 159 and an inner surface 160. A hollow cylindrical brass bushing 161 is centered on axis 155 and defines an outer bearing surface 162. The bushing is secured by a rivet 163 which is admitted through a hole cut in arm 130 that is centered on axis 155. The rivet clamps bushing 161 to arm 130 so that the arm and bushing rotate together around axis 155. The hole through which the rivet protrudes is filled with a plug 164. Bushing 161 includes a raised integral collar 166 which defines an outer surface 167 that can comate with surface 160. The bushing is capable of moving parallel to axis 155 through a path S. Movement to the right as shown in FIG. 13 is stopped when surfaces 160 and 167 meet. Movement to the left as shown in FIG. 13 is stopped when the corresponding surfaces of bearing 152 meet. A cap 169 covers the opening of hub 158. The interior of the bearing is filled with a stable conductive silicon fluid 170 which provides a constant mechanical resistance no matter how far the bearing rotates around axis 155. The fluid also provides a mechanical resistance when bearing surface 162 moves parallel to axis 155 with respect to bearing surface 159.

Bearing 152 is identical to bearing 153 and includes a hollow cylindrical hub 172, a rivet 174 and a plug 176 (FIG. 11).

In order to use the attachment, brush assembly 104 is lowered from the position shown in FIG. 11 to the position shown in FIG. 15 in order to guard stylus 62 while the attachment is being inserted into cartridge body 30. As the brush is lowered to the position shown in FIG. 15, leading edge 140 of pivot arm 129 rides over cam surface 86 and into abutting position with surface 88. Pivot arm 130 cooperates in the same manner with detent 94. As a result of this unique detenting structure, pivot arms 129 and 130 not only serve as moment arms to help guide brush 106 over the surface of disc 20, but also serve as a detenting device for holding the brush assembly in a guard position.

After the brush assembly has been located in the guard position, housing 68 of the attachment is inserted into opening 37 in the manner shown in FIG. 8. As housing 68 is inserted, it engages clip 46, thereby completing an electrically conducting path between brush 106 and pin 44 which is grounded. Referring to FIG. 11, the path extends from brush 106 through clamp 107, u-shaped lever 126, bearings 152 and 153, including conductive fluid 170 (FIG. 13), conductive frame 72 and housing 68 to clip 46. Referring to FIG. 8, the path continues from clip 46 through shield 31 and strap 45 to grounded pin 44. This is an important feature which places brush 106 at the same potential as shield 31 and pin 44, components normally connected to signal ground potential. By use of this feature, the surface of the recording disc and the inside of the grooves of the disc can be discharged to the same potential as the shield surrounding windings 38 and 39.

After the attachment is inserted into the cartridge, tab 116 is manually moved to the position shown in FIG. 7 so that brush 106 can engage the grooves of disc 20. Referring to FIG. 15, this result is achieved by reversing the detenting operation previously described. That is, trailing surface 141 is urged over bevel surface 87 so that the brush assumes the approximate free position shown in FIG. 7. (The approximate free position also is shown as phantom view A, FIG. 15). Arm 130 cooperates with detent 94 in a similar manner.

Tone arm 27 is then moved to the position shown in FIGS. 1 and 3 so that stylus 62 engages a groove of disc 20. Counterweight 28 is adjusted so that the recommended tracking force is applied to stylus 62. In most modern cartridges of the type illustrated in the drawings, the tracking force should be 0.75 gram to 1.25 grams. When brush 106 is moved to the position shown in FIG. 7, it is automatically biased into an engagement with the grooves of disc 20 by biasing mass 114. When the attachment is used with a cartridge of the kind previously described, the mass has a weight sufficient to cause brush 106 to be biased toward disc 20 with a force of 0.5 gram. Since brush 106 is biased against disc 20 with less force than stylus 62, the tendency of brush 106 to urge stylus 62 against the side of the groove is minimized and prevented from adversely affecting the performance of the cartridge.

To accomodate the force applied by brush 106, counterweight 28 is normally adjusted to apply a force of 1.25 to 1.75 grams to the cartridge body. 0.75 to 1.25 grams of this force then is applied by the stylus and 0.5 gram is applied by brush 106.

Brush bristles 108 may vertically engage the grooves of disc 20 as shown in FIG. 7. Alternatively, the bristles may be canted in the direction of rotation of disc 20 as shown, for example, by the manner in which bristles 108 are canted with respect to plane D in FIG. 11. To achieve this result, brush 106 may be fixed to u-shaped lever 126 in a position rotated clockwise from the one shown in FIG. 11.

As disc 20 is rotated by turntable 16, the static electricity on the surface of the disc and inside the grooves is conducted through brush 106 to shield 31 and pin 44 by means of the circuit previously described. This is an important feature which helps maintain the potential of the recording disc near signal ground.

Even if the brush assembly is maintained in the rest position (FIGS. 6 & 11) while stylus 62 is engaging a record groove, some of the static electricity will be removed from the record surface. This is an important feature which keeps static electricity to a minimum even though the operator of the brush assembly forgets to move it to the free position. Although the physics of static removal in the rest position is not completely understood, it is believed that the unique carbon brush fibers and grounding circuit contribute to this feature.

Brush 106 engages the inside of the disc grooves and follows the disc as it is rotated. If a warp in the record is encountered, brush 106 follows the disc and couples the force created by the warp to cartridge body 30 and tone arm head 29 through the mechanical resistance provided by fluid 170 in bearings 152 and 153. As brush 106 follows the warps in the surface of the disc 20, bearings 152 and 153 are rotated around axis 155. This unique operation provides an equal mechanical resistance no matter how far the bearings are rotated.

It has been discovered that the attachment also damps the lateral vibrations of the tone arm head described in FIG. 4. Although the exact mechanism for this unique advantage is not fully understood, it is believed that the compliant nature of the carbon bristles of brush 106, the engagement of the grooves by the brush bristles and the side play through distance S (FIG. 13) of the bearings may be the primary reasons for this mode of operation. The bearings are capable of moving laterally through distance S, thereby coupling the lateral forces from the cartridge body and tone arm head 29 through the mechanical resistance supplied by fluid 170 to brush 106 and the disc grooves. As head 29 vibrates laterally, bushing 161 moves parallel to axis 155, whereas member 82 remains relatively stationary with respect to the axis. Since fluid 170 is located between surfaces 159 and 162, it provides a mechanical resistance to the relative movement of the surfaces, thereby damping lateral vibrations of the tone arm head.

Those skilled in the art will recognize that only a preferred embodiment of the invention has been disclosed, but that other modifications and changes can be made without departing from the spirit and scope of the invention as defined in the appended claims.

What is claimed is:

1. An attachment for damping the low frequency tracking resonance of a stylus carried by a stylus support means capable of biasing the stylus into engagement with the grooves located on the planar surface of a rotating phonograph disc recording by the application of a predetermined tracking force to the stylus, said attachment comprising:

brush means having sufficient stiffness to engage the recording disc grooves as said disc is rotated and being fabricated at least in part from bristles having free ends capable of extending into the disc grooves for following the disc grooves as said disc is rotated;

biasing means suitable for causing the brush means to be biased toward the disc with a bias force less than the predetermined tracking force and greater than the minimum force needed to cause the brush means to follow warps of the disc surface; and stabilizing means for coupling the stylus support means to the brush means through a predetermined mechanical resistance capable of damping vibrations occuring perpendicular to the planar surface of the disc whereby low frequency tracking resonance of the stylus caused by vibrations of the stylus support means perpendicular to the planar surface of the disc can be damped, said stabilizing means comprising bearing means for coupling the brush means to the stylus support means, said bearing means defining an axis of rotation and comprising cylindrical comating bearing surfaces which move relative to each other in a direction parallel to the axis of rotation whereby the vibrations parallel to the surface of the disc recording are damped, and a viscous fluid for damping the movement of the bearing means, said viscous fluid extending between the bearing surfaces, whereby the mechanical resistance of the bearing means is maintained constant throughout any degree of rotation of the bearing means.

2. An attachment for stabilizing the movement of a phonograph cartridge body when mounted in a free end of a tone arm, said attachment comprising:

a hollow stylus housing insertable into the cartridge body;

an elastic cushion supported by the inside of the housing;

a stylus shank supported by the cushion for vibratory movement;

a stylus attached to the shank and lying in a first plane bisecting the shank, said stylus including a tip adapted to engage the grooves of a rotating phonograph recording disc, the tip lying in a second plane perpendicular to the first plane;

a frame supporting the stylus housing and extending on both sides of the first plane;

a brush comprising at least in part bristles having free ends capable of engaging the inside of the recording disc grooves;

a mass attached to the brush for causing the brush to be biased toward the second plane with a predetermined force;

a first rotary bearing mounted on the frame and located on a first side of the first plane;

a second rotary bearing mounted on the frame and located on a second side of the first plane opposite the first side, the first and second bearings defining an axis of rotation perpendicular to the first plane and displaced from the second plane, said first and second bearings including surface capable of at least vector components of relative movement parallel to both the first and second planes;

first pivot arm means rotatable around the axis for connecting the brush to the first rotary bearing;

second pivot arm means rotatable around the axis for connecting the brush to the second rotary bearing; and a viscous fluid located inside the first and second bearings, whereby the vibrations of the cartridge body parallel to both the first and second planes can be damped.

3. An attachment, as claimed in claim 2, wherein the first and second rotary bearings are equidistant from the first plane.

4. An attachment, as claimed in claim 2, wherein the brush includes a first edge located substantially in the first plane and a second edge located between the first plane and a third plane which passes through the first rotary bearing and which is parallel to the first plane.

5. An attachment, as claimed in claim 2, wherein the first and the second rotary bearings each comprise cylindrical bearing surfaces which rotate with respect to each other and which move parallel to the axis with respect to each other.

6. An attachment, as claimed in claim 2, wherein at least the free ends of the bristles are less than 0.5 mil in diameter.

7. An attachment, as claimed in claim 6, wherein the bristles comprise carbon.

8. An attachment, as claimed in claim 2, wherein the mass weighs less than 0.75 gram.

9. An attachment for removing static electricity from a disc recording as the grooves of the disc are being engaged by a phonograph cartridge containing an electrical transducing coil connected to signal ground through a conductor, said attachment comprising:
   a brush fabricated at least in part from carbon bristles having free ends capable of engaging the inside of the disc grooves;
   biasing means suitable for causing the brush to be biased toward the disc with a predetermined force; and
   means for electrically connecting the brush to the conductor, said means for electrically connecting including bearing means operatively connected to the cartridge, said bearing means containing a conductive silicon fluid, whereby the movement of the cartridge relative to the disc is damped and whereby the static electricity is removed from the grooves.

10. An attachment, as claimed in claim 9, wherein free ends of bristles have a diameter less than 0.5 mil.

11. An attachment, as claimed in claim 9, wherein the biasing means comprises a mass weighing about 0.3 to 0.4 gram.

12. An attachment for stabilizing the movement of a stylus support means capable of biasing a phonograph stylus into engagement with the grooves located on the planar surface of a rotating phonograph disc recording by the application of a predetermined tracking force to the stylus, said attachment comprising:
   brush means fabricated at least in part from bristles having free ends capable of engaging the inside of the disc grooves for substantially damping vibrations of the stylus support means parallel to the planar surface of the disc, said brush means having sufficient stiffness to transmit forces applied to the free ends of the bristles in directions both perpendicular and parallel to the planar surface of the disc;
   biasing means suitable for causing the brush means to be biased toward the disc with a predetermined bias force; and
   stabilizing means for coupling the stylus support means to the brush means through a predetermined mechanical resistance capable of damping vibrations occurring in a direction perpendicular to the planar surface of the disc, whereby vibrations of the stylus support means both perpendicular and parallel to the planar surface of the disc can be damped, said stabilizing means comprising bearing means for coupling the brush means to the stylus support means, said bearing means including comating surfaces defining an axis of rotation and capable of moving relative to each other in a direction parallel to the axis, whereby the vibrations parallel to the surface of the disc recording are damped, and including a viscous fluid for damping the movement of the bearing means.

13. An attachment for stabilizing the movement of a stylus support means capable of biasing a phonograph stylus into engagement with the grooves located on the planar surface of a rotating phonograph disc recording by the application of a predetermined tracking force to the stylus, said attachment comprising:
   brush means fabricated at least in part from bristles having free ends capable of engaging the inside of the disc grooves for following the disc grooves as said disc is rotated;
   biasing means suitable for causing the brush to be biased toward the disc with a predetermined bias force; and
   stabilizing means, including surfaces enabling at least vector components of relative movement both perpendicular and parallel to the planar surface of the disc, for coupling the stylus support means to the brush through a predetermined mechanical resistance capable of damping vibrations occurring in directions both perpendicular and parallel to the planar surface of the disc, whereby vibrations of the stylus support means both perpendicular and parallel to the planar surface of the disc can be damped.

14. An attachment, as claimed in claim 13, wherein at least the free ends of said bristles are less than 0.5 mil in diameter, whereby the brush contributes to the damping of the vibrations parallel to the planar surface of the recording disc.

15. An attachment, as claimed in claim 14, wherein said bristles are fabricated from carbon.

16. An attachment, as claimed in claim 13, wherein the predetermined bias force is less than the tracking force.

17. An attachment, as claimed in claim 13, wherein the stabilizing means comprises:
   bearing means for coupling the brush to the stylus support means; and
   a viscous fluid for damping the movement of the bearing means.

18. An attachment, as claimed in claim 13, wherein the stabilizing means includes comating bearing surfaces defining an axis of a rotation and wherein the bearing surfaces move relative to each other in a direction parallel to the axis, whereby the vibrations parallel to the surface of the recording disc are damped.

* * * * *